United States Patent Office 3,303,836
Patented Feb. 14, 1967

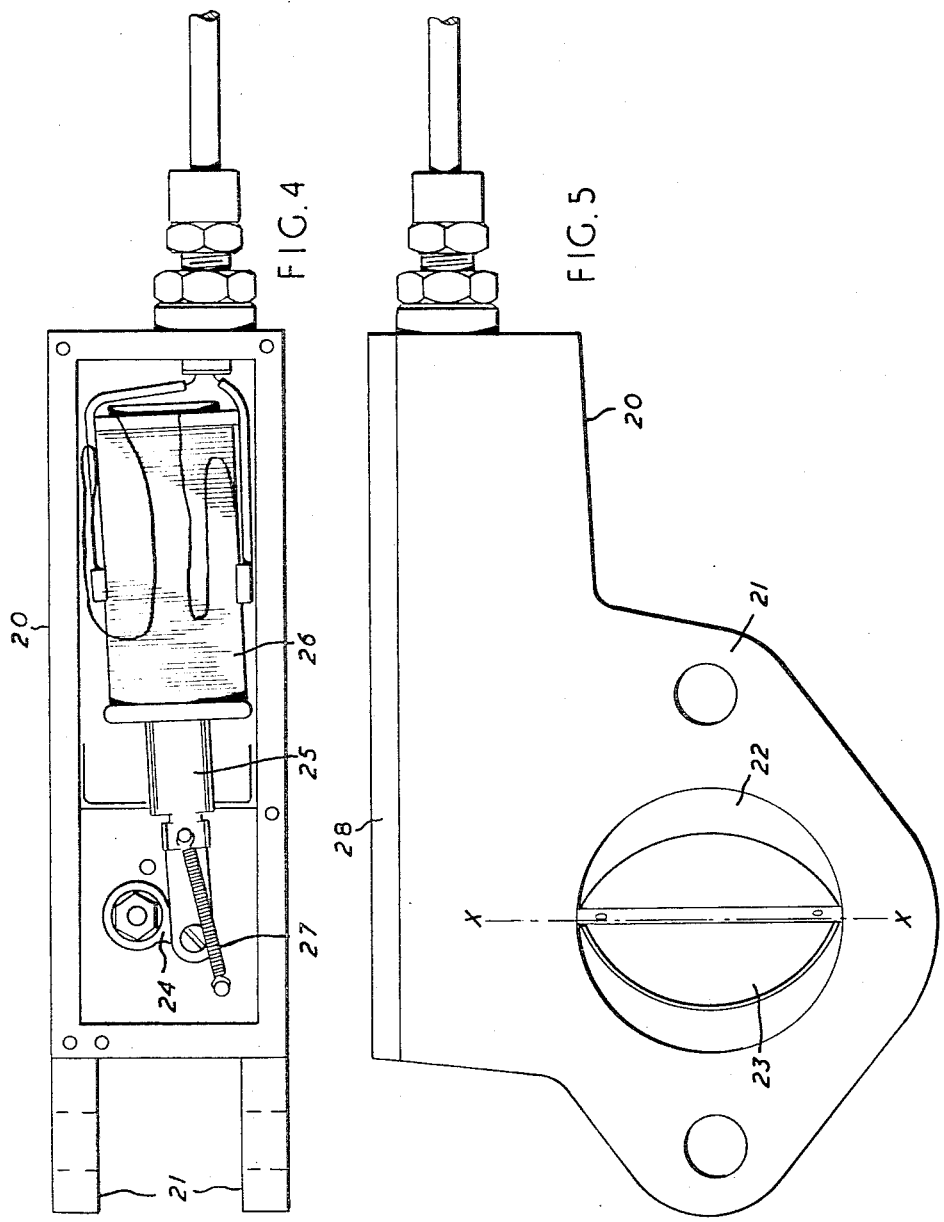

3,303,836
THEFT-PREVENTION DEVICES FOR VEHICLES
David Samuel Burleigh, 20 Aylestone Ave.,
London, England
Filed Feb. 8, 1965, Ser. No. 431,111
5 Claims. (Cl. 123—198)

This invention relates to theft-prevention devices for vehicles and provides apparatus which immobilises a vehicle engine whenever it is left by the driver and which requires special knowledge, or lengthy investigation, before the engine can be started.

According to the invention, a theft-prevention device for a vehicle comprises electrical circuit apparatus which includes a relay-operated circuit breaker, for actuating means for immobilising the vehicle, and two switches in circuit with the relay, one switch being open automatically so long as the driver is not in driving position in the vehicle and the other switch being a manual switch which must be operated to close the circuit breaker to render the immobilising means ineffective whenever the automatic switch has opened.

Preferably, the automatic switch is spring-loaded to open and is closed by the weight of the driver on the driving seat. Other arrangements are of course possible, for example foot-board closure of the automatic switch in a vehicle in which the driver stands.

The manual switch may be a press switch, or other switch, such as a wiping contact switch, which requires a manual operation for each effective closure. The manual switch may be concealed or disguised, for example combined with one or more switches normally provided on a vehicle.

A vehicle equipped with the device can be started only when the driver is in position and the manual switch has been closed for the actual occasion of starting. Should the driver leave his position, either voluntarily or as a result of actual or threatened assault in the course of a robbery for example, the automatic switch opens the relay circuit, the circuit breaker opens to immobilise the engine, and cannot again be closed, even though the driver's position may again be occupied, until the manual switch has been closed to operate the relay.

According to a feature of the invention, the device includes a switch, a switch-operating key, and spring-operated means which ejects the key from the switch when the user releases his pressure on the key.

Such a key-operated switch may be the manual switch referred to or may be an additional switch, connected in series with the automatic switch. Such an additional switch is particularly suitable for use in association with the engine-ignition switch so that the same key can operate both the additional and the engine-ignition switch. In such a combined arrangement, the spring-operated means would always ensure that the ignition key was not left in place for a thief to use, and that, once the ignition was switched off, the manual switch would have to be operated before the vehicle could be driven away.

In one construction of a key-operated switch, a barrel, rotatable by the key fitted therein to operate the switch, is spring-loaded by a spring, for example a torsion spring, in known manner so that the barrel tends constantly to return to one position, and a spring-loaded ejector is provided which is effective to thrust the key from the barrel when the barrel has returned to said position.

The spring-loaded ejector may be incorporated in the switch or may be carried by the key.

Thus, for example, the ejector may be a spring-loaded rod which extends part-way through the barrel to be encountered by the forward end of the key, when the key is thrust into the barrel, and depressed before the barrel is turned.

Alternatively, where the ejector is carried by the key, the ejector may consist of a sliding thrust piece retained on the forward end of the key bit or blade and spring-loaded towards the forward end by a helical compression spring located around the stem or shank of the key between the sliding thrust piece and the key bow.

According to a further feature of the invention, the device includes means for immobilising an internal-combustion engine of a vehicle, consisting of a valve for closing-off completely the induction pipe to a diesel or other internal combustion engine on a vehicle, such valve being in addition to the usual throttle control valve.

The induction-closing valve is controlled by the relay-operated circuit braker and preferably operated electrically, such as by a solenoid, either for opening and closing or for opening or closing, the valve being spring-loaded in the latter case for closing or opening respectively under the spring load.

For example, the valve may be spring-loaded to close and be opened by a solenoid controlled by the circuit breaker so that as long as the vehicle is under authorised control, the solenoid remains energised to hold the valve open but if the circuit breaker is opened the valve closes under its spring loading and cannot be opened again until the control circuit is properly operated.

Alternatively, a solenoid, preferably spring-assisted, may be provided to operate to close the valve if the circuit of theft-prevention apparatus is broken.

The induction-closing valve and its operating system is preferably made as a self-contained unit for insertion at a suitable place in the vehicle induction system.

Further features of the invention will be apparent from the following description of various embodiments of the invention with reference to the accompanying drawings in which:

FIG. 4 is a plan of an induction-closing valve and its operating mechanism, and FIG. 5 is an end elevation of the induction-closing valve of FIG. 4.

Figure 1:
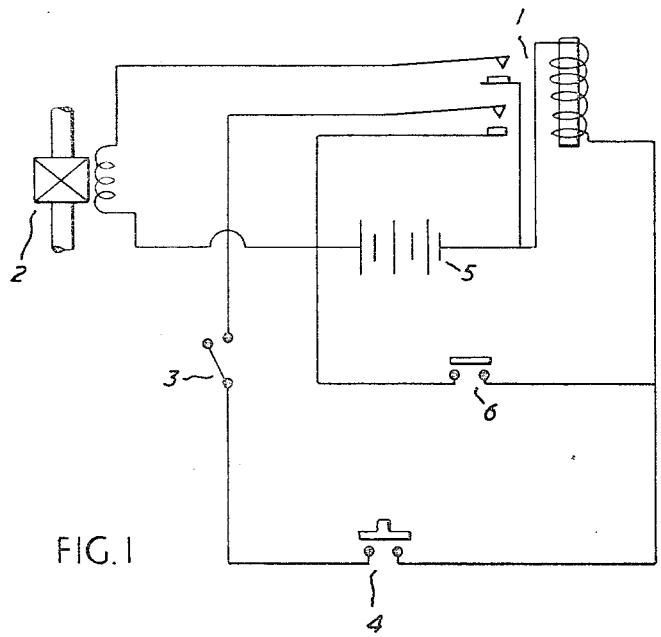
FIG. 1 is a circuit diagram of a theft-prevention device for a vehicle.

The diagram of FIG. 1 shows a multiple contact relay circuit breaker 1 which must be closed to open a solenoid-operated fuel lock 2 and complete the circuit for an engine switch 3 through an automatic seat switch 4, conveniently a so-called limit switch, and the relay of the circuit breaker to the battery 5. A manual press switch 6 is provided in direct circuit with the battery 5 and the relay of the circuit breaker.

Initially, the manual switch 6 must be closed to energise the relay to close the circuit breaker 1. This opens the fuel lock, in the example shown, but the engine switch 3 is inoperative until the automatic seat switch 4 is closed by the weight of the driver in position.

Once the switches 3 and 4 are closed, the relay remains energised, through these switches and one of its own contact pairs, but if the switch 3 or 4 is opened, even momentarily, the circuit breaker opens and its relay cannot be energised again except by operation of the manual press switch 6.

It will be appreciated that the fuel lock 2 could also be placed in circuit with the seat switch 4 and that other engine accessories could similarly be controlled through an appropriate number of contact pairs on the circuit breaker 1.

The seat switch is of course arranged so that it is not affected by normal cushioning movement of the driving seat.

The fuel lock and relay circuit breaker is strongly encased in a sealed unit in a position not easily accessible on the vehicle and the ancillary wiring may be concealed or incorporated in other wiring on the vehicle so that it is difficult to trace or short-circuit by a direct connection to the battery.

The engine switch 3 is combined with the engine ignition switch (not shown) for simultaneous operation by a key thrust into a rotatable barrel (not shown) forming part of the combined switch and loaded by a torsion spring in known manner so that the barrel tends constantly to return to a zero or neutral position once the user releases his pressure on the key. Switches having spring-loaded, key-operated rotatable barrels are well known and need not be further described.

To ensure that the key cannot be left in the barrel of the switch for a thief to use, the key carries an ejector which thrusts the key out of the barrel once the barrel has returned to the neutral position.

Figure 2:
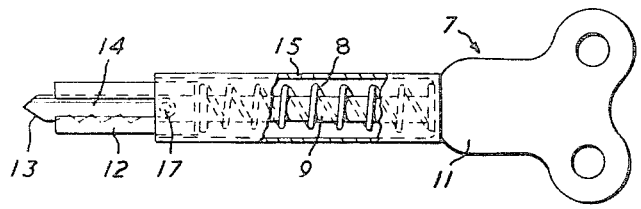
FIG. 2 is a side elevation, with a part broken away, of a key for a key-operated switch.
Figure 3:
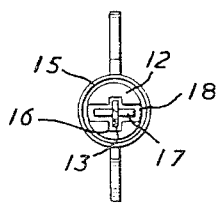
FIG. 3 is an end elevation of the key of FIG. 2.

As shown in FIG. 2 the key 7 has a helical compression spring 8 located around the stem or shank 9 of the key between the bow 11 and a sliding thrust piece 12 retained on the forward end 13 of the bit or blade 14. The spring 8 is enclosed in a tubular sheath 15 and the thrust piece 12 is a circular rod or other block with an internal diametral or other transverse and axially extending slot 16 for the key bit or blade to slide in. The thrust piece is retained on the key, with limited freedom to slide, by a cross-pin 17 in the key bit or blade engaging in another slot 18 in the thrust piece, crossing the key-slot at right-angles.

In an alternative form, the thrust piece is retained by a retaining pin or flange acting between the inner end of the thrust piece and the inside of the forward end of the spring sheath.

When the key is inserted in the barrel, the thrust piece slides back along the key bit or blade, to allow insertion, the spring is thereby compressed and, after the barrel has been turned to operate the switch and the key has returned to its original position, the spring 8 recovers and ejects the key as soon as the user releases his pressure on the key.

As an alternative to the described arrangement of key-operated switch, a key as described could be used with a switch which can be turned only between positions in which the key is not retained in the switch so that at any such position the key is ejected by its own spring.

In a different embodiment of the invention, the fuel lock 2 for immobilising the engine is replaced by a valve for closing off completely the induction pipe of the engine, such valve being in addition to the usual throttle control valve.

Such a valve, as shown in FIGS. 4 and 5, forms, with its operating mechanism, a self-contained unit 20 for insertion between the usual induction pipe and manifold of an engine, the unit having mounting flanges 21 to match the joint flanges usually provided.

The unit consists of a short, additional length of induction pipe 22 in which a butterfly blade 23 of eliptical shape is mounted for rotation about an axis X—X transverse to the length of the induction pipe by means of a pivoted link 24 actuated by a plunger 25 of a solenoid 26. A valve closing spring 27 is provided to hold the valve closed, and in use, the solenoid, pivoted link, closing spring and plunger are protected by a cover plate 28.

The solenoid 26 is connected to be energised on closure of the relay-operated contact breaker by operation of the manual switch 6 (FIG. 1) with the driver in the driving seat, the energisation of the solenoid causing movement of the solenoid plunger to actuate the link and open the valve against the valve closing spring.

The butterfly blade 23 is of elliptical shape so that at a small angle of turning from a centrally aligned open position in the induction pipe 22 it encounters the wall of the pipe and closes obliquely across it.

The provision of an induction closing valve for immobilising a diesel engine presents a considerable advantage over any arrangement which involves cutting-off the fuel because a fuel cut-off is liable to cause an air-lock in the system and this causes difficulty in normal operation of the engine.

I claim:
1. Theft-prevention apparatus in a vehicle having a driver-position, said apparatus comprising vehicle-immobilising means, electrical circuit means for controlling said vehicle-immobilising means, circuit-breaker means in said circuit means, relay means for controlling said circuit-breaker means, and first and second switch means in parallel in circuit with said relay means, said first switch means being located in said driver-position and being open automatically so long as said driver-position is not occupied and said second switch means being manually operable.

2. Theft-prevention apparatus in a vehicle having a driver-position, said apparatus comprising electrical circuit means, vehicle-immobilisation means operatively connected with said circuit means, a relay circuit breaker in said circuit means, said vehicle-immobilisation means being effective to immobilise the vehicle when said circuit breaker is open, a manual switch in said circuit means and operable to close said circuit breaker, an automatically-open switch in said circuit means, and means in said driver-position to close said automatically-open switch only when said driver-position is occupied, said automatically-open switch being connected to control said circuit breaker only through closure of said circuit breaker by operation of said manual switch.

3. Apparatus according to claim 2, a vehicle control switch in said circuit means, a key for said vehicle control switch and spring means to eject said key from said switch.

4. Apparatus according to claim 2, said vehicle having an internal combustion engine, and said vehicle-immobilisation means comprising shut-off valve means in the induction means of said engine.

5. Apparatus according to claim 4, said shut-off valve means comprising an induction pipe unit, flange-mounting means on said unit, a butterfly valve blade in said unit, a closing spring connected to said valve blade, and a solenoid means connected to said circuit means and operative to open said valve blade.

References Cited by the Examiner

UNITED STATES PATENTS

| 1,422,318 | 7/1922 | Stevens | 180—82.5 |
| 1,477,771 | 12/1923 | Rowntree | 180—82.5 |
| 1,810,641 | 6/1931 | Camp | 180—82.5 |
| 2,007,066 | 7/1935 | Witbeck | 180—82.5 |
| 2,151,639 | 3/1939 | Golden | 180—82.7 X |
| 2,187,761 | 1/1940 | Torrens | 180—82.7 X |
| 2,612,232 | 9/1952 | Morrison | 180—82 |

MARK NEWMAN, *Primary Examiner.*

W. E. BURNS, *Assistant Examiner.*